United States Patent [19]

Richardson

[11] 4,061,273
[45] Dec. 6, 1977

[54] TANK SPREADER

[75] Inventor: James L. Richardson, St. Paul, Minn.

[73] Assignee: Veda, Inc., Long Lake, Minn.

[21] Appl. No.: 500,133

[22] Filed: Aug. 23, 1974

[51] Int. Cl.² .............................................. B05B 1/20
[52] U.S. Cl. .................................. 239/172; 137/205;
 137/625.22; 141/18; 141/67
[58] Field of Search ................ 239/172, 146; 222/178;
 141/18, 65, 67, 286, 2; 137/202, 205, 625.22,
 625.24

[56] References Cited

U.S. PATENT DOCUMENTS

| | | | |
|---|---|---|---|
| 2,133,580 | 10/1938 | Searle | 137/625.22 X |
| 2,229,931 | 1/1941 | Parker | 137/625.22 |
| 3,411,672 | 11/1968 | Lely et al. | 222/178 X |
| 3,489,320 | 1/1970 | MacKinnon | 239/172 X |
| 3,544,010 | 12/1970 | Jurdyc | 239/172 X |
| 3,612,089 | 10/1971 | Beguiristain | 137/202 X |
| 3,706,319 | 12/1972 | Neese et al. | 137/205 |

*Primary Examiner*—John J. Love
*Assistant Examiner*—Michael Mar
*Attorney, Agent, or Firm*—Burd, Braddock & Bartz

[57] ABSTRACT

A liquid manure spreading apparatus having a tank and a pump selectively operable to evacuate air from within the tank or supply air to the tank. A safety shut off valve located in the tank having a ball and an elongated float confined in a cage is operable to block the evacuation of air from the tank when the tank is full of liquid manure. A control valve mounted on the pump has a single spool selectively moveable with a handle to an air evacuating position and an air supplying position. A single air line is connected to the valve and tank.

4 Claims, 9 Drawing Figures

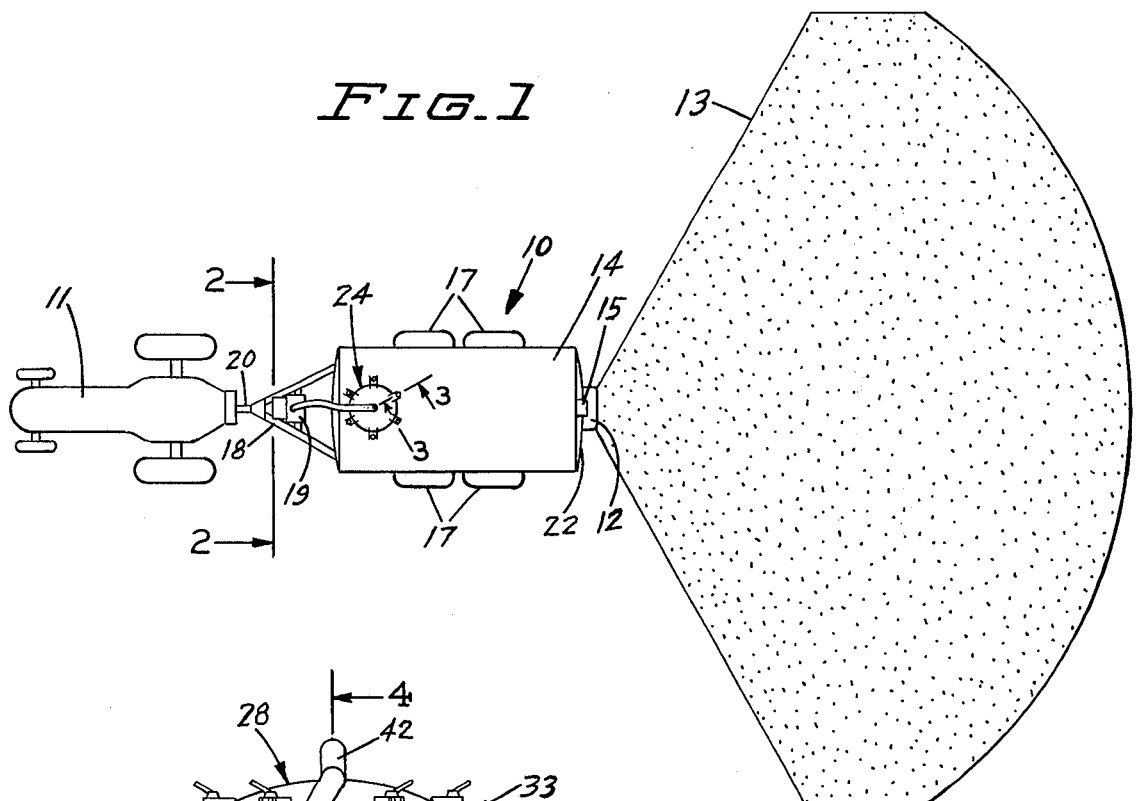
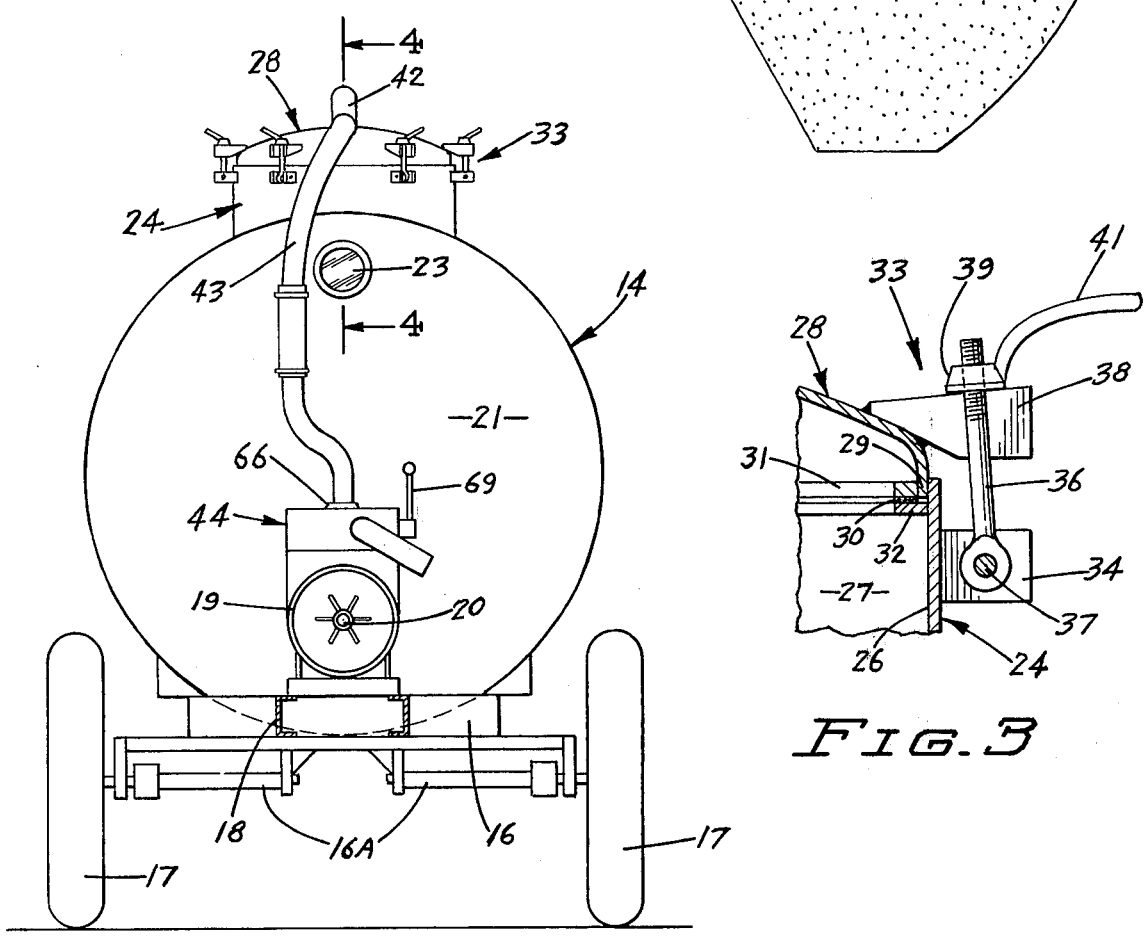

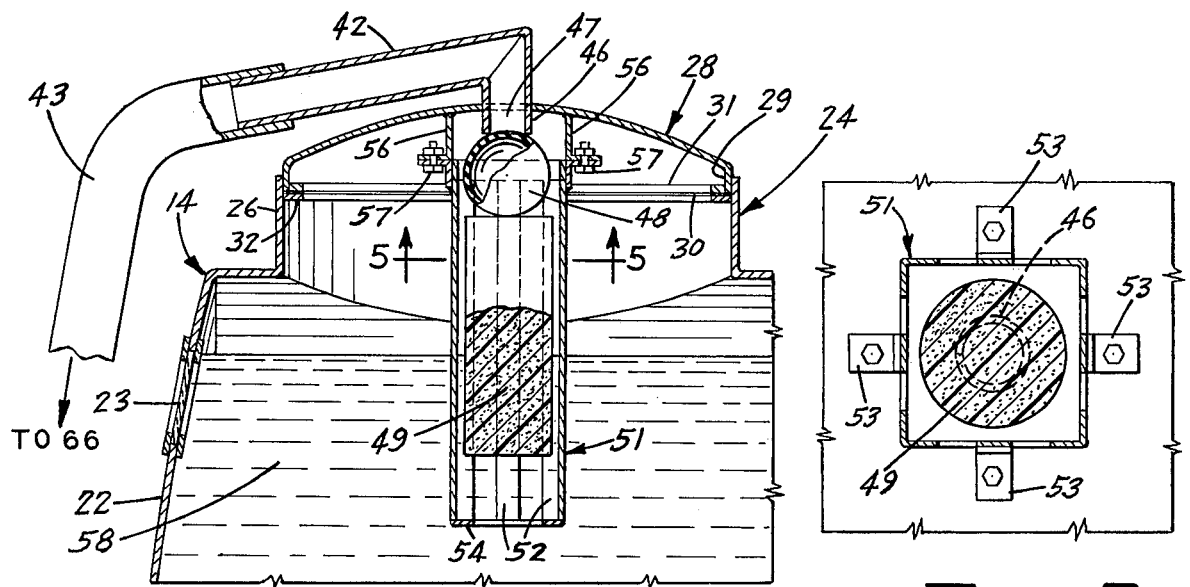
FIG.4
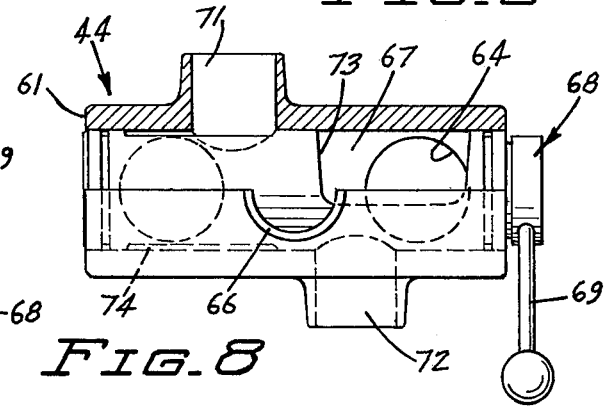
FIG.5
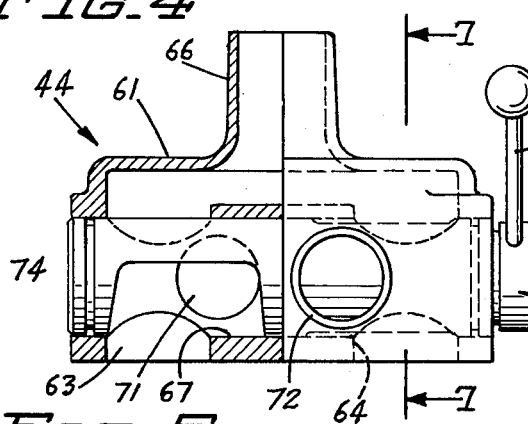
FIG.6
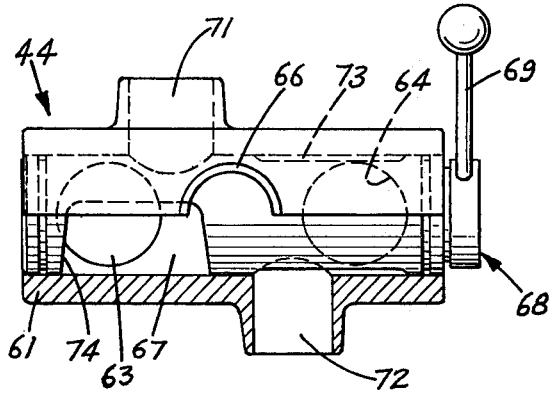
FIG.8
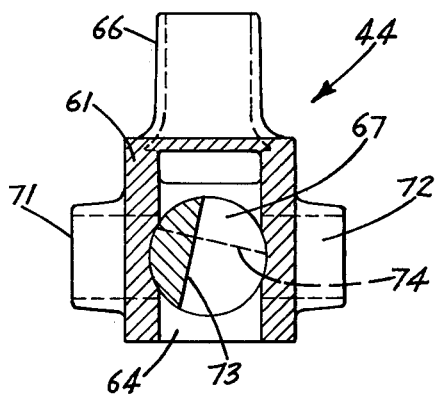
FIG.7
FIG.9

TANK SPREADER

BACKGROUND OF INVENTION

Liquid manure spreading machines have been developed to spread animal manures on the soil. These machines have a tank mounted on a trailer towed by a vehicle, as a tractor. A pump operated by the tractor functions to selectively apply air pressure or withdraw air from the tank. The tank is filled by suction forces applied to a fill hose connected to the tank. The material is spread by applying air under pressure to the tank. An example of this type of machine is shown in U.S. Pat. No. 3,528,612. The pump in some air pressure tank spreaders is connected to the tank with an air pressure line and a separate vacuum line. The pump is an air pump which will become inoperable, damaged and in most cases destroyed when liquid foam, or manures enter the pump. Safety shut off valves are used to protect against liquids, manures and foam from entering the pump. These valves have been ineffective in eliminating the entry of these materials into the pumps. The result is that the pumps become inoperative and must be repaired or replaced.

SUMMARY OF INVENTION

The invention is related to a material handling apparatus operable to collect, transport, and spread liquid and semi-liquid materials onto a desired location. More particularly, the invention is a liquid manure spreader having a tank for storing liquid manure. A tank is supported on means connectable to a tractor for moving the tank along the ground. Pump means operates to selectively evacuate air from the tank and supply air under pressure to the tank. Control valve means connected to an air line and pump means is operable to direct air under pressure into the tank and to vent exhaust air withdrawn from the tank by the pump means. A manure discharge assembly on the tank spreads the manure in a swath behind the tank when air under pressure is supplied to the tank. A separate manure inlet allows manure to move into the tank when air is evacuated from the tank. Safety shut off valve means located inside the tank operates to prevent the evacuation of air from the tank in response to the full level of liquid manure in the tank. The safety shut off valve means includes a valving member and an elongated float for moving the valving member to a closed position to prevent liquids, foams and manure from entering the pump means. A rigid open cage means confines the valving member and the float so that they are free to move in response to the level of the liquid manure in the tank. The control valve means has a single valving spool operable to selectively connect the pump means to evacuate air from the tank or supply air under pressure to the tank. A single hose or air line connects the control valve means with the tank.

An object of the invention is to provide a liquid material spreading apparatus with safety shut-off valve structure operable in response to the level of liquid in the tank of the apparatus to prevent the movement of liquid or foam from the tank into the air evacuating pump. Another object of the invention in to provide control valve means for coupling an air pump to a liquid carrying tank which uses a single line between the valve and tank to selectively carry air from the tank and supply air to the tank. A further object of the invention is to provide a liquid material spreading apparatus with a fill port usable with a fill hose that is separate from the material discharge assembly of the apparatus. These and other objects of the invention are set forth in the following description of the invention.

IN THE DRAWINGS

FIG. 1 is a top plan view of the vacuum tank material spreader of the invention connected to a towing vehicle;

FIG. 2 is an enlarged sectional view taken along the line 2—2 of FIG. 1;

FIG. 3 is an enlarged sectional view taken along the line 3—3 of FIG. 1;

FIG. 4 is an enlarged sectional view taken along the line 4—4 of FIG. 2;

FIG. 5 is an enlarged sectional view taken along the line 5—5 of FIG. 4;

FIG. 6 is a front elevational view, partly sectioned, of the control valve mounted on the pump as shown in FIG. 2;

FIG. 7 is a sectional view taken along the line 7—7 of FIG. 6;

FIG. 8 is a top plan view of the valve FIG. 6, partly sectioned, showing the valve spool in the vacuum position; and FIG. 9 is a top plan view of the valve similar to FIG. 8 showing the valve spool in the pressure position.

DESCRIPTION OF PREFERRED EMBODIMENT

Referring to FIG. 1 there is shown the material spreader of the invention indicated generally at 10 towed by a power unit 1 such as an agricultural tractor. Spreader 10 has a material discharge assembly 12 operable to direct material rearwardly of the spreader 10 in a swath having generally even spread pattern 13. The material dispensed from the discharge assembly 12 has a low profile and a uniform and controlled center spread pattern. This spread pattern does not produce rooster tailing and result in blow back on the operator. The material discharge assembly 12 is constructed according to the material spreader structure disclosed in U.S. patent application Ser. No. 435,843. The spreader structure in U.S. patent application Ser. No. 435,843 is incorporated in this application by reference. The spreader 10 is used as part of a liquid manure handling system by hog or poultry producers and dairymen. Vacuum forces are used to draw the manure into the tank which can have a 1000 to 2000 or more gallon capacity. The manure in the tank is subjected to air under pressure to remove and spread the material. The following description is directed to handling a liquid manure with spreader 10. It is understood that other materials, liquids and semi-solids, can be handled with spreader 10.

Material spreader 10 has an elongated tank 14 mounted on a rectangular frame 16. Two pairs of tandem wheels 17 are connected to frame 16 with an undercarriage having walking beam suspension 16A. Frame 16 has a forwardly converging A frame tongue 18 that is connected to the drawbar of the tractor 11. Mounted on the tongue 18 is a vacuum/pressure pump 19 selectively operable to withdraw or evacuate air from the tank 14 or discharge air under pressure into the tank 14. The pump 19 is connected to the tractor 11 with a conventional PTO drive 20. Pump 19 is an air pump having a housing carrying a rotor having radial vanes. Other types of air pumps can be used to evacuate and supply air to the tank 14.

Tank 14 has a circular front wall 21 and circular rear wall 22. A small window 23 is mounted in the upper portion of the front wall 22 to provide for the visual inspection into the tank. Window 23 is used as a visual indicator for monitoring the level of the material, such as liquid manure in the tank 14. An intake port 15 is mounted on the rear wall 22 above the discharge assembly 12. An inlet or fill hose (not shown) is adapted to be connected to port 15 whereby liquid manure is sucked into the tank via the inlet hose. The separate intake port 15 and discharge assembly 12 provide for clean and easy hookup of the fill hose. As shown in FIG. 1 and 2, an upwardly directed doem indicated generally at 24 is secured to the top of the front portion of the tank 14. Dome 24 comprises upright cylindrical wall 26 having a passage 27 leading to the interior of tank 14. An inverted dish shaped cover or hatch indicated generally at 28 closes the top of dome 24. As shown in FIGS. 3 and 4, cover 28 has a downwardly directed circular flange 29. An annular ring 31 is secured to the inside of flange 29. The end of flange 29 and the bottom side of ring 31 are located over an inwardly directed shoulder 32 secured to the inside of the wall 26. The shoulder 32 is a ring member forming a seat for the cover 28. An annular washer or gasket 30 is located between the ring 31 and the shoulder 32 to seal the cover 28 on the dome 24.

A plurality of clamp assemblies indicated generally at 33 are used to hold the cover 28 in sealing relationship with the dome 24. The clamp assemblies 33 are identical in structure. The following description is limited to the clamp assembly 33 as specifically shown in FIG. 3. Clamp assembly 33 has a pair of outwardly directed tabs 34 secured to the outside of wall 26. An eye bolt 36 has a head end located between the tabs 34. A pin 37 extended through the eye of the eye bolt 36 pivotally connects the eye bolt to the tabs 34. A pair of radially outwardly directed ears 38 are secured to an outer peripheral portion of the cover 28. The body of the eye bolt 36 is located between the ears 38. A nut 39 threaded in the end of the eye bolt engages the top of the ears 38 to hold the cover 28 in a clamped and sealing relation with the dome 24. An outwardly directed handle 41 is secured to the nut 39 to facilitate the rotation of the nut without the use of special tools.

Cover 28 is connected to the pump with a single line or hose whereby air can be selectively introduced or withdrawn from the tank. As shown in FIGS. 2 and 4, a tubular member 42 is secured to the center portion of cover 28. The passage of the tubular member 42 is open to the interior of the tank. A hose 43 coupled to the tubular member 42 leads to a control valve indicated generally at 44 mounted on top of the vacuum/pressure pump 19. Control valve 44 has a single valving member or spool which is operable to selectively connect the pump to the tank to supply air under pressure to the tank or withdraw air from the tank.

Tubular member 42 has a downwardly directed projection 46 having an outlet 47 open to the interior of the dome 24. A valve means is operable to close the outlet 47 in response to the level of the liquid material in the tank 14. The valve means comprises a hollow ball 48 located above a cylindrical float 49. The ball 48 and the float 49 are located in an open cage indicated generally at 51. The ball 48 and float 49 are free to move in a vertical direction toward and away from the projection 46. Cage 51 has a plurality of laterally spaced straps 52 secured to a bottom member 54. Member 54 is a flat plate having a large center hole. The upper ends of the straps 52 have outwardly directed tabs 53. The cage 51 is a generally elongated rectangular unit having an internal dimension larger than the diameters of the ball 48 and float 49 so that both the ball and the float have limited lateral movement as well as free up and down movement.

Cage 51 is attached to the cover 28 to position the ball 48 in vertical alignment with the end of projection 46. Tabs 53 are aligned with legs 56 secured to the bottom of cover 28. Legs 56 have outwardly directed portions accommodating nut and bolt assemblies 57 to connect the cage 51 to the cover 28.

The ball 48 is a hollow member of flexible rubber or plastic. The cylindrical float 49 is a foam material, such as polystyrened or polyurethane. The foam material does not absorb liquids and is substantially lighter than water so that it will readily float in the liquid material and any foam generated by the liquid material. The liquid material shown at 58 in FIG. 4 can be liquid manure with the accompanying bedding. Animal manure, as hog manure, and cattle manure are conventionally transported and spread with this type of material spreader. The float 49 is carried upward by the liquid material and foam generated by agitation of the liquid material. This moves the ball 48 is a closed relationship with the end of projection 46 to prevent liquid and foam from being drawn into the pump 19.

The control valve 44 mounted on the vacuum/pressure pump 19 is shown in FIGS. 6 to 9. Valve 44 has a housing 61. Housing 61 has a generally flat base 62 which fits on top of the pump 19. The base 62 has ports 63 and 64 aligned with the intake and exhaust ports of the pump 19. The center portion of the top of housing 61 has an upwardly directed nipple 66. Hose 43 is mounted on the nipple to connect the valve 44 in fluid communication with the interior of tank 14.

Housing 61 has a transverse bore 67 accommodating a cylindrical spool indicated generally at 68. A radially outwardly directed handle 69 is secured to one end of the spool 68 to facilitate the rotation of the spool in the bore 67 to selectively connect the pump 19 to evacuate air from the tank or supply air to the tank. A pair of side ports 71 and 72 in opposite sides of housing 61 are open to separate parts of the bore 67. Spool 68 has a first cavity 73 adjacent the handle end of the spool for selectively providing a passage between the port 64 and the nipple 66 and port 64 and the side port 72. A second cavity 74 in spool 68 is operable to selectively connect the port 63 with the nipple 66 and the side port 71. As shown in FIG. 7 the cavities 73 and 74 are in right angle relationship relative to each other.

FIGS. 6, 7, and 8 show the control valve 44 in the pressure position. The spool 68 has been rotated with the handle 69 in a counter-clockwise direction. The cavity 73 provides a passage between the port 64 and the nipple 66. This permits the air to flow through hose 43 into the tank 14. The air is drawn into the pump 19 via the side port 71, cavity 74, and port 63.

FIG. 9 shows the control valve 44 in the vacuum position. The spool 68 has been rotated in a clockwise direction with the handle 69. The cavity 74 provides for communication between the port 63 and the nipple 66. The air is exhausted from the pump through the port 64, cavity 73, and side port 72.

The control valve 44 is mounted on the pump 19 so that the handle 69 can be conveniently used to switch the spool from a vacuum position to a pressure position. The valve 44 is operable to activate air from the tank 14 or supply air to the tank 14 through a single line or hose 43 connected to the dome 28.

In use, the spreader 10 is connected to the tractor 11. The tractor power take off is connected with the PTO drive 21 to operate the vacuum/pressure pump 19. The tank 14 is filled with liquid manure by evacuating air from the tank. The fill hose is connected to the inlet port 15 on the back wall of the tank. Suction forces move the liquid manure through the fill hose and into the tank. The level of the manure in the tank can be visually inspected through the window 23. The agitation of some types of manure will produce foam on top of the liquid manure. When the level of the manure in the tank is at the window 23 the operator turns off the power to the pump 19 and closes the intake valve (not shown) located in the intake port 15. The lever 69 of the control valve is moved to the pressure position so that the pump 19 is ready to supply air under pressure to the tank.

The efficiency and life of the pump 19 is increased if the foam and liquid are not allowed to move to the pump. The safety shut off valve means comprising the ball 48 and the float 49 functions to close the inlet to the tubular member 42 when the level of the liquid is adjacent to the window 23 as shown in FIG. 4. The cylindrical float 49 extended in the generally upright direction moves the ball 48 in an upward direction till the opening 47 is closed. The foam and liquid will carry the cylindrical member 49 in an upward direction thereby preventing foam, liquids and manures from entering the pump. If foreign materials enter the pump the vane and rotor structures become inoperative and destroyed. These structures will break thereby requiring extensive repair to or replacement of the pump.

The tank is then moved to the field or location where the manure is to be deposited. The control valve 44 is then moved to the pressure position by moving the handle 69 toward the tractor. The pump 19 operates to supply air under pressure to the tank. The control valve for the discharge assembly 12 is opened. The material is dispensed in a low profile and uniform spread pattern 13 as shown in FIG. 1. The liquid manure will continually dispense from the tank 14 as long as air under pressure is supplied to the tank. When the tank 14 is empty, the control valve 44 is moved back to its neutral position.

While there has been shown and described preferred embodiments of the invention, it is understood that changes in structures, materials, arrangement of the structures, and parts may be made by those skilled in the art without departing from the invention.

The embodiments of the invention in which an exclusive property or privilege is claimed are defined as follows:

1. A liquid manure spreader comprising: a tank having a chamber for storing liquid manure, means having an opening in communication with the chamber, a cover closing said opening, pump means for selectively evacuating air from the chamber and supplying air under pressure to the chamber, control valve means for selectively controlling the movement of air to and from the chamber, air line means connected to the cover and valve means providing an air connection between the valve means and the chamber, manure discharge means on the tak for spreading manure when air under pressure is applied to the chamber, manure inlet means allowing manure to move into the chamber when air is evacuated from the chamber, safety shut-off valve means located inside the chamber operable to prevent the evacuation of air from the tank through the air line means in response to the level of the manure in the chamber, said shut-off valve means including valving means movable to a closed position in response to the level of the manure in the chamber to prevent escape of liquid manure into the air line means and pump means, and means attaching the shut-off valve means to the cover, said control valve means including a housing having a bore, a first section and a second section, said bore extended through said sections, a first port in the first section open to the bore and to the atmosphere, a second port in the first section open to a bore and to the air intake of the pump, a third port in the first section open to the bore and air line means, a fourth port in the second section open to the bore and atmosphere, a fifth port in the second section open to the bore and air exhaust of the pump, a sixth port in the second section open to the bore and air line means, a spool rotatably located in said bore, said spool having a first cavity and a second cavity, said first cavity positionable in a first position in communication with the first and second ports and a second position in communication with the second and third ports, said second cavity positionable in communication with the fifth and sixth ports when the spool is in the first position whereby air under pressure is directed from the pump to the air line means, and positionable in communication with the fourth and fifth ports when the spool is in the second position whereby air is evacuated from the air line means by a pump.

2. The spreader of claim 1 wherein: said housing has a passage connected to the third and sixth ports, said passage being connectable to the air line means.

3. The spreader of claim 1 wherein: said first cavity and second cavity are axially spaced and normally located relative to each other.

4. The spreader of claim 1 including: handle means connected to the spool to facilitate rotation of the spool between the first position and second position thereof.

* * * * *

UNITED STATES PATENT AND TRADEMARK OFFICE
CERTIFICATE OF CORRECTION

PATENT NO. : 4,061,273
DATED : December 6, 1977
INVENTOR(S) : James L. Richardson It is certified that error appears in the above-identified patent and that said Letters Patent are hereby corrected as shown below:

Column 4, line 15, "polystyrened" should be -- polystyrene --.

Column 6, line 11, "tak" should be -- tank --.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks